Patented June 30, 1953

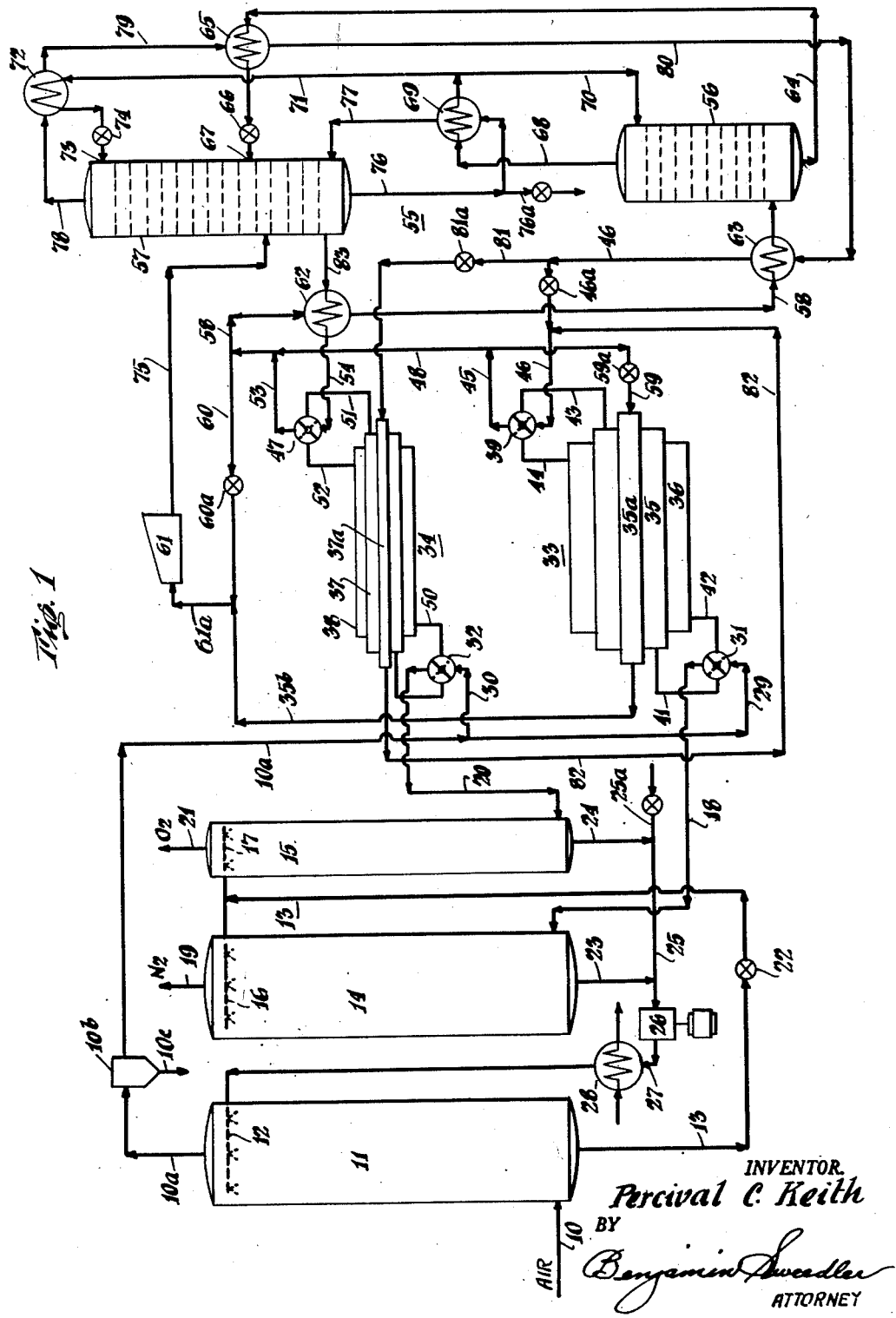

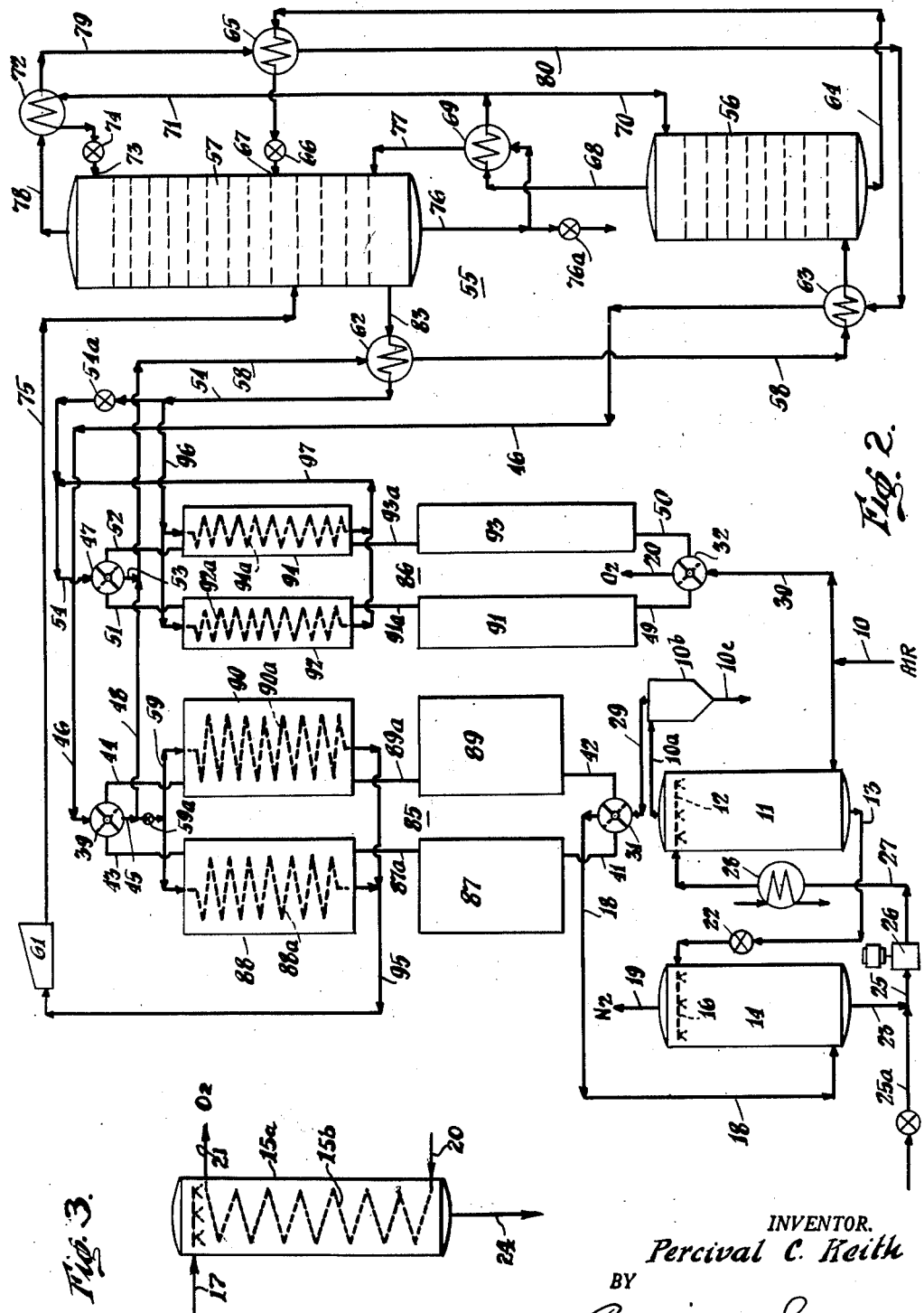

2,643,527

UNITED STATES PATENT OFFICE 2,643,527

PRECOOLING AIR IN OXYGEN PRODUCTION

Percival C. Keith, Peapack, N. J., assignor to Hydrocarbon Research, Inc., New York, N. Y., a corporation of New Jersey Application March 26, 1948, Serial No. 17,214

7 Claims. (Cl. 62—175.5)

This invention relates to the production of oxygen by the liquefaction and rectification of air, and more particularly to an improved method of cooling the air introduced into the rectification system.

All temperatures herein are in degrees F. and pressures in pounds per square inch gauge.

Oxygen is commonly produced by the liquefaction of air and rectification of the liquefied air at low temperatures. The refrigeration necessary for air liquefaction is supplied to the air after it has been compressed and water-cooled to approximately 70° to 110° F. by direct heat exchange with the effluent products of rectification. The temperature at which the air is water-cooled usually depends upon the season of the year; thus, in summer the air is usually water-cooled to a temperature of about 110° F. and in winter to about 70° F. To refrigerate the air, reversing exchangers of the regenerative or recuperative type with exceptionally high heat transfer capacity are employed through which the incoming air and the cold products of rectification are passed with periodically reversed operation so that streams of relatively warm air are flowed through the paths traversed by the nitrogen and oxygen during a previous step of the process. Moisture, carbon dioxide and other impurities deposited in these paths during the passage of air therethrough are removed by sublimation during the subsequent flow of products of rectification in a reverse direction. Such reversal of flow may take place every three minutes. These exchangers represent a material and substantial part of the cost of an oxygen plant. Further, one of the important problems encountered in their operation is to prevent them from plugging up with impurities deposited therein from the air stream so as to permit continuous operation.

It is an object of the present invention to provide a process of producing oxygen by the liquefaction and rectification of air in which a substantial volume of impurities contained in the air is removed from the air economically, before the air is introduced into the reversing exchangers, and a substantial saving in reversing exchanger volume for a given oxygen capacity is effected.

Other objects and advantages of this invention will be apparent from the following detailed description thereof.

In accordance with this invention, air compressed, for example, to a pressure of about 60 to about 100 pounds and, if desired, water-cooled to a temperature of from about 70° to about 110° F., before introduction into a reversing exchanger, is passed upwardly through a downwardly flowing stream of brine initially at a temperature below the freezing point of water, desirably in the range of about 20° to about —10° F., thereby cooling the air to a temperature below the freezing point of water, desirably about 0° F., and removing moisture and other condensibles, including a portion of the carbon dioxide contained therein and simultaneously warming the brine. The thus cooled air is passed through the reversing exchanger to recover the cold content of the rectification product from the rectification system, thereby cooling the air to a temperature near its liquefaction point. The thus cooled air is introduced into the rectification system where it is rectified to produce the rectification product which is passed through the reversing exchanger. From the reversing exchanger the rectification product is passed in heat exchange relation with the warm brine leaving the air cooling step, thus cooling the brine.

In the preferred embodiment of the invention, the air at a pressure of 60 to 100 pounds and water-cooled to a temperature of from 70° to 110° F. is passed countercurrent to a downflowing stream of brine, entering at a temperature of about 20° to —10° F. and leaving at a temperature approaching that of the entering air. The air is thus cooled to about 30° to 0° F. The thus warmed brine is passed downwardly through a pair of towers countercurrent to ascending streams of nitrogen and oxygen rectification products which enter these towers at a temperature of about 20° to —10° F. and a pressure only slightly above atmospheric, say 1 pound, and which leave at a temperature close to that of the entering air, say within about 10° F. of the air temperature. More specifically, the brine may be pumped from the base of these towers at a temperature of —5° F., refrigerated to a temperature of —10° F. and at this temperature recycled to cool the incoming air stream to a temperature of 0° F.

The pre-cooling of the air, as herein described, prior to its introduction into the reversing exchangers to a temperature of about 0° F. removes approximately 25% of the cooling duty from the reversing exchangers, as compared with prior conventional procedure in which air water-cooled to a temperature of from about 70° to 110° F. is introduced into the reversing exchangers. Hence, for the same oxygen capacity, exchangers of approximately 25% less volumetric capacity may be employed in practicing the process of this invention, with consequent saving in plant investment. Further, the moisture and carbon dioxide content of the air entering the reversing exchangers is materially reduced, facilitating and simplifying the purging of the exchangers. This means, for instance, where ordinarily the reversal of streams through the reversing exchangers is effected every 3 minutes, the present invention permits less frequent reversals, say every 9 minutes. The reduction in temperature of the entering air results in a corresponding reduction in volume, thereby permitting the design of a plant having flow lines and reversing valves of a smaller cross-sectional area or an increase in capacity for equipment of a given size.

In the accompanying drawings forming a part of this specification and showing for purposes of exemplification preferred layouts of equipment for practicing the process of this invention;

Figure 1 illustrates diagrammatically a preferred layout of equipment for practicing the process of this invention;

Figure 2 illustrates another form of the air-cooling equipment which may be used in connection with this invention; and Figure 3 illustrates an indirect heat exchanger which may be used in the layout of Figure 1 in lieu of oxygen tower 15.

It will be understood that the invention may be carried out in other apparatus than that shown in the drawings. For example, any desired number of reversing exchangers may be used in lieu of the reversing exchangers shown in the drawings. Each of the reversing exchangers shown in the drawings may be replaced by two or more smaller exchangers placed in series and/or parallel, if desired. Other rectification systems may be used in lieu of that shown in Figure 1, etc.

Referring to Figure 1, 10 is an air inlet leading to an air cooling tower 11, desirably a packed tower into which air under pressure introduced through line 10 passes upwardly countercurrent to brine introduced at 12 and exiting from the tower at 13. As the brine, herein used in a broad sense, any solution may be employed such as calcium chloride solutions, sodium chloride solutions, caustic soda solutions, organic salt solutions, sugar solutions, glycerol solutions or others which remain liquid at the lowest temperature reached in each specific instance. Alkali solutions are desirable since they can be made to absorb a larger proportion of the carbon dioxide content of the air. The warm brine flows continuously through line 13 into the top of nitrogen and oxygen towers 14, 15, entering the top of these towers through discharge pipes 16 and 17, respectively. Nitrogen enters tower 14 through line 18 and flows up through the descending brine stream in this tower, exiting through line 19. Oxygen enters tower 15 through line 20 and flows up through the descending brine stream in this tower, exiting through line 21. Each of the towers 11, 14 and 15 may be desirably packed with slats or may be of any suitable construction, permitting intimate contact between the liquid and gas passing therethrough. Tower 11 is maintained at the pressure of the entering air, usually from about 60 to about 100 pounds, against which pressure the brine is supplied to this tower with the aid of pump 26. Towers 14 and 15 are operated at the pressure of the nitrogen and oxygen streams passing therethrough, usually very close to atmospheric pressure. The higher pressure in tower 11 naturally forces the brine through line 13 and valve 22 into towers 14 and 15.

The brine leaves towers 14 and 15 through lines 23, 24, entering line 25 equipped with pump 26 which delivers the brine to line 27 at the necessary pressure for its discharge into tower 11. Line 27 leads through a refrigerating system 28 where the brine cooled by the nitrogen and oxygen in towers 14 and 15 is further cooled by any suitable refrigerating medium such as ammonia flowing in indirect heat exchange relation therewith. From the refrigerating system 28 the brine cooled to a temperature of about −10° F. is recycled by line 12 through tower 11, effecting cooling of the air passing through this tower.

The air leaves the brine tower 11 through line 10a which passes through trap 10b for removing entrained moisture from the air. Trap 10b is provided with a usual drain line 10c. Line 10a is provided with branch lines 29 and 30 leading to the reversing valves 31 and 32 of reversing exchangers 33 and 34, respectively. These exchangers may be of any well known type. In the embodiment shown in Figure 1, they are of the recuperative type and consist of a shell in which are provided three flow paths. In the case of exchanger 33, concentric paths 35a, 35 and 36 are disposed in heat exchange relation with each other. In the case of exchanger 34, concentric paths 37a, 37 and 38, likewise, are disposed in heat exchange relation with each other. Each heat exchanger has in its paths suitable fins of heat conducting material, e. g., copper or aluminum, promoting rapid and efficient heat exchange between the gaseous media flowing therethrough.

For purposes of illustration, and in the interests of simplicity, each flow path in an exchanger is shown on the drawings as consisting of a single tube, the paths being disposed concentrically. However, each path in the exchanger may comprise a multiplicity of tubes for flow therethrough.

Paths 35 and 36 are the paths through which air and nitrogen flow, the flow of these two media through their respective paths being periodically reversed so that during one step of the process air flows through path 36 and nitrogen through path 35 and upon reversal during the succeeding step air flows through path 35 and nitrogen through path 36. Reversal of flow is accomplished by suitably positioning the reversing valves 31, 39 which may be of any well known type. Valve 31 is disposed in a pipe line system consisting of the air inlet branch 29, nitrogen exit line 18 and pipe lines 41, 42 leading to one end of paths 35, 36, respectively. Pipe lines 43, 44 lead from the other end of the exchanger paths 35, 36, respectively, to valve 39. Air line 45 leads from valve 39 and nitrogen inlet line 46 leads into this valve.

Paths 37 and 38 are the paths through which air and oxygen flow, the flow of these two media through their respective paths being periodically reversed so that during one step of the process air flows through path 38 and oxygen through path 37, and upon reversal during the succeeding step air flows through path 37 and oxygen through path 38. Reversal of flow is accomplished by suitably positioning the reversing valves 32, 47, which may be of any well known type. Valve 32 is disposed in a pipe line system consisting of the air inlet branch 30, oxygen exit line 20 and pipe lines 49 and 50 leading into one end of paths 37, 38, respectively. Pipe lines 51 and 52 lead from the other end of the exchanger paths 37, 38, respectively, to valve 47. Air line 53 leads from this valve and an oxygen inlet line 54 leads into this valve.

The cooled air discharging from lines 45 and 53 enters line 48. The major portion of the air flows from line 48 into line 58 and the remainder flows into lines 59 and 60 provided with valves 59a and 60a, respectively. Through control of valves 59a and 60a, the remainder of the cooled air partly flows through path 35a in exchanger 33 and partly through line 60 to expander 61. The air flowing through path 35a is warmed. The warmed air enters line 61a by way of line 35b where it mixes with the air entering line 61a from line 60, the resultant air mixture reaching expander 61 at a sufficiently raised temperature to avoid the formation of liquid air during its expansion.

A minor portion of the nitrogen flowing through line 46 passes through line 81 and valve 81a, path 37a in exchanger 34 and line 82 and reenters line 46 between valves 39 and 46a. In this manner, the nitrogen enters exchanger 33 at a temperature closer to the temperature of the cooled air exiting therefrom by way of valve 39.

Reversing exchangers 33 and 34 may be placed in vertical, horizontal, or any other desired position. When these exchangers are arranged vertically, the cold end may be above or below the warm end. In general, the nitrogen flow paths through the exchangers should have approximately four times the volumetric capacity of the oxygen flow paths. If desired, exchangers in which the oxygen and nitrogen flow paths are of the same volumetric capacity may be employed, in which case four air-nitrogen reversing exchangers are employed for each air-oxygen reversing exchanger. Also, of the total air cooled by indirect heat exchange with the nitrogen and oxygen products of rectification, about 80% flows through the air-nitrogen exchanger 33 and about 20% through the air-oxygen exchanger 34.

The rectification system 55 comprises two columns 56 and 57. Column 56 is operated at a pressure of from about 60 to about 100 pounds, preferably at about 70 to 85 pounds, and column 57 at a pressure of from about 2 pounds to about 10 pounds, preferably at about 5 pounds. These columns, as customary, are provided with rectification plates of the bubble cap or other desired type. Air is supplied to the base portion of high pressure column 56 through a line 58 after passing through non-reversing heat exchangers 62 and 63.

Crude oxygen containing approximately 40% oxygen, the rest being chiefly nitrogen, flows from the base of column 56 through line 64 which passes through a non-reversing heat exchanger 65. Upon flow through the expansion valve 66 in line 64, the crude oxygen is flashed, entering column 57 at 67. Line 68 leads from the top of column 56, passes through a non-reversing heat exchanger 69 into a line having one branch 70 for returning liquid reflux comprising chiefly nitrogen to column 56 and another branch 71 passing through the non-reversing exchanger 72 and leading into the low pressure column 57 at 73. An expansion valve 74 is disposed in branch 71.

Air from expander 61 flows through a line 75 into the lower portion of the low pressure column 57. The base of this column is provided with a line 76 leading into the non-reversing heat exchanger 69. A line 77 leads from this exchanger into the low pressure column 57. The lines 76, 77 and the cooperating heat exchanger 69 function as a reboiler; liquid oxygen flows through line 76 into exchanger 69 in indirect heat exchange relation with the gaseous stream comprising chiefly nitrogen passing through line 68 which causes vaporization of the liquid oxygen to take place, the oxygen vapors flowing into column 57. Line 76 is provided with valved branch 76a for periodically removing some liquid oxygen to prevent the build-up of high-boiling impurities, such as acetylene, within the rectification system.

A nitrogen line 78 leads from the top of column 57 into exchanger 72. From this exchanger a nitrogen line 79 leads into exchanger 65 through which the crude oxygen passes as hereinabove described. From exchanger 65 a nitrogen line 80 leads to exchanger 63 through which the air passes. Nitrogen line 46 leads from exchanger 63 into the reversing valve 39, and, as above described, is provided with a branch 81 through which a minor portion is passed into path 37a.

An oxygen line 83 leads from the base of low pressure column 57 into the exchanger 62 through which the air passes. From this exchanger oxygen line 54 leads into the reversing valve 47.

In the practice of the process of this invention in the equipment shown in Figure 1, air compressed to a pressure of from about 60 to about 100 pounds, preferably about 70 to 85 pounds, and water-cooled to a temperature of from 70° to 110° F. enters at 10 and flows up through the brine cooling tower 11 countercurrent to a down-flowing stream of brine, desirably a solution of calcium chloride, entering at 12 at a pressure of from about 60 to about 100 pounds and a temperature of about −10° F. The air in its flow through the tower 11 is thus cooled by the brine to a temperature of 0° F. and exits through line 10a. The warm brine flows through line 13 into the top of nitrogen and oxygen towers 14, 15, entering these towers at a temperature close to that of the air entering at 10, say not more than about 10° F. lower than the air temperature at 10. Nitrogen and oxygen at a temperature of about −10° F. and a pressure of about 1 or 2 pounds enter these towers through lines 18 and 20, respectively, flow up therethrough and cool the brine, the nitrogen and oxygen exiting from towers 14 and 15 through lines 19 and 21, respectively, at a temperature approaching that of the air entering at 10. The brine at a temperature of about −5° F. flows through lines 23, 24 into line 25, whence it is forced by pump 26 through the refrigerating system 28 where the brine is cooled to a temperature of about −10° F., at which temperature it is recycled through tower 11.

Approximately 20% of the thus cooled air at a temperature of 0° F. flows through branch 30 and the remaining 80% through branch 29. The air from branch 29 flows into reversing valve 31, line 42, path 36 in indirect heat exchange with the nitrogen flowing from valve 39 through line 43, path 35 into line 41, the nitrogen leaving path 35 at a temperature of −10° F. and at this temperature entering the nitrogen tower 14 through line 18. The air in its flow through path 36 is cooled to near its liquefaction point under the pressure conditions prevailing at the exit end of path 36, i. e., to a temperature of from −260° to −280° F. by the nitrogen entering at a temperature of from −265° to −285° F. Simultaneously, air flows from branch 30 through valve 32, line 50 into and through path 38 of exchanger 34, leaving this path through line 52 at a temperature of from about −260° to about −280° F. Oxygen at a temperature of from about −260° F. to about −280° F. flows through line 54, valve 47, line 51, path 37, leaving this path through line 49, valve 32 at a temperature of about —10° F., at which temperature it enters the oxygen tower 15. The air exiting from reversing exchangers 33 and 34 is at a temperature of from 5° to 10° F., preferably 6° to 8° F., above the temperature of the rectification product streams entering these exchangers.

Approximately 20% of the air thus refrigerated is partially warmed by flow through path 35a and at a temperature of about —240° F., flows into expander 61 and is expanded to a pressure of about 5 pounds and at this pressure and a temperature of about —305° F. enters low pressure column 57 through line 75. The remaining major portion of the air flows through line 58 into and through heat exchangers 62, 63 and into the base of the high pressure column 56, the air entering this column at a temperature slightly lower than that of the air exiting from exchangers 33 and 34. The air is rectified in the rectification system 55 to produce the oxygen product of rectification flowing from low pressure column 57 into the reversing exchanger 34 and the nitrogen product of rectification flowing from the top of column 57 through lines 78, 79, 80 and 46 into the reversing exchanger 33.

Upon reversal, which may take place every five minutes, air from branch 29 flows through valve 31, line 41 and flow path 35 of the reversing heat exchanger 33 while nitrogen flows through path 36 of this exchanger. Air from branch 30 flows through valve 32, line 49 and flow path 37 in heat exchanger 34, while the oxygen flows through flow path 38. During this step of the process flow through the air pre-cooling system consisting of the towers 11, 14 and 15, through the expander 61, through paths 35a and 37a and the rectification system 55 is the same as hereinabove described. The temperature and pressure conditions of the air and rectification product streams remain the same as hereinabove described. The nitrogen flowing through flow path 36 removes by sublimation condensibles such as moisture and carbon dioxide deposited therein from the air stream flowing therethrough during the preceding step of the process. In like manner the oxygen flowing through flow path 38 removes therefrom condensibles deposited therein from the air stream passing therethrough during the preceding step of the process.

The modification of Figure 2 differs from that of Figure 1 chiefly in that a regenerative type of reversing heat exchanger is used instead of the recuperative type of Figure 1. In this modification, parts the same as those of Figure 1 have been given the same reference characters.

The regenerator system of Figure 2 comprises two regenerator groups 85, 86. Regenerator group 85 comprises two regenerator pairs 87, 88 and 89, 90 for the alternate flow of air and nitrogen therethrough. Regenerator group 86 comprises two regenerator pairs 91, 92 and 93, 94 for the alternate flow of air and oxygen therethrough. Desirably each of the regenerator units of group 85 is four times the capacity of each of the regenerator units of group 86. Each regenerator unit may be of any well known type containing heat transfer material of high heat absorbing capacity, for example, they may contain packing units of copper or aluminum as disclosed and claimed in pending application Serial No. 783,498, filed November 1, 1947, now Patent No. 2,585,912, dated February 19, 1952.

Reversal of flow through the regenerator group 85 is accomplished by the pair of reversing valves 31 and 39. Reversing valve 31 communicates with regenerators 87 and 89 through pipe lines 41 and 42, is provided with an air inlet line 29 leading from water trap 10b and the nitrogen exit line 18. Reversing valve 39 communicates with regenerators 88, 90 through lines 43 and 44, respectively, is provided with an air exit line 45 and a nitrogen inlet line 46, the air exit and nitrogen inlet lines 45, 46 corresponding with those bearing the same reference numerals in the modification of Figure 1 and leading to and from a rectification system, such as shown in Figure 1, or any other well known type of rectification system in which the refrigerated air is rectified to produce oxygen and nitrogen. Regenerator 87 communicates with 88 through line 87a and 89 with 90 through line 89a.

The regenerators 88 and 90 are provided with paths 88a and 90a, respectively, in indirect heat exchange relation with the air and nitrogen alternately passed through each of these regenerators. A minor portion of the cooled air leaving these regenerators passes from line 45 through valve 59a, line 59, paths 88a and 90a into line 95 entering expander 61, the air thus entering the expander at a temperature such that no liquefaction of the air takes place in the expander.

Reversal of flow through regenerator group 86 is accomplished by the pair of reversing valves 32 and 47. Valve 32 is provided with lines 49 and 50 leading into the regenerators 91, 93, respectively, is also provided with an air inlet line 30 leading from the main air line 10 and the oxygen exit line 28. Reversing valve 47 communicates with the regenerators 92, 94 through lines 51, 52, respectively, is provided with an oxygen inlet line 54 and an air exit line 53 corresponding to the lines indicated by these reference characters in the modification of Figure 1 and communicating with a rectification system such as shown in Figure 1. Regenerator 91 communicates with 92 through line 91a and 93 with 94 through line 93a.

The regenerators 92 and 94 are provided with paths 92a and 94a, respectively, in indirect heat exchange relation with the air and oxygen alternately passed through each of these regenerators. A valve 54a is disposed in the oxygen line 54. This valve controls the relative proportion of oxygen passed through line 54 into reversing valve 47 and that passed through line 96, paths 92a and 94a, through line 97, from which the oxygen warmed by passage through paths 92a and 94a mixes with the oxygen flowing through line 54 into reversing valve 47 causing the resultant mixed oxygen stream to enter regenerators 92, 94 at a temperature close to that of the exiting air stream.

In the modification of Figure 2, streams of nitrogen rectification product and air, pre-cooled to a temperature below the freezing point of water, desirably about 0° F., by flow through tower 11, as hereinabove described in connection with Figure 1, flow alternately over the packing disposed in the regenerator pairs 87, 88 and 89, 90, the nitrogen imparting its cold content to this packing and the air recovering this cold when it flows thereover during the succeeding step of the process. Oxygen and air flow alternately through the regenerator pairs 91, 92 and 93, 94, the oxygen imparting its cold content to the packing in these regenerators and the air recovering this cold when it flows thereover during the succeeding step of the process. During flow of the nitrogen through one or the other of the regenerator pairs 87, 88 and 89, 90 the flow of the oxygen through one or the other of the regenerator pairs 91, 92 and 93, 94, these rectification products remove by sublimation condensibles deposited in these regenerators from the air in its flow therethrough during the preceding step of the process. Thus, in the continued operation, upon each reversal the nitrogen and oxygen rectification products effect removal of the carbon dioxide, moisture and other condensibles deposited in the paths through which the air had passed during the preceding step of the process, thereby permitting continuous operation.

In the modification of Figure 2 only the nitrogen is employed to cool the warm brine entering tower 14; an oxygen cooling tower corresponding to tower 15 of Figure 1 is not employed. Further, a minor portion of the air is supplied directly to the regenerators without pre-cooling by the brine. Accordingly, the regenerator units 91 and 93 are longer than units 87 and 89 since they cool the air from an initial temperature of about 70° to 110° F. rather than from an initial temperature below the freezing point of water, say about 0° F.

In Figures 1 and 2, the air leaving cooling tower 11 flows desirably through a trap 10b to remove entrained brine which is discharged at 10c. Make-up brine is fed through valved line 25a.

It will be noted the process of this invention results in economic removal of a substantial volume of condensibles contained in the air before the air is introduced into the reversing exchangers, thereby facilitating purging of the exchangers. Further, it permits the use of reversing exchangers of materially smaller volumetric capacity for a given oxygen capacity with consequent saving in plant investment. A further saving is effected in that the flow of nitrogen and/or oxygen through the brine, in addition to cooling the brine by imparting their cold content to the brine, effects evaporation of a portion of the brine and creates additional refrigeration.

The expressions "reversing the flow of air and nitrogen" and "reversing the flow of air and oxygen" and "reversal" are used herein in the sense commonly employed in this art, namely, to mean the switching of the flow of the two streams, for example, the air and the nitrogen streams, or the air and the oxygen streams, so that upon each reversal the air flows through the path through which had previously flowed the nitrogen or oxygen and the nitrogen or oxygen flows through the path through which had previously flowed the air.

Since certain changes in carrying out the above process and different embodiments of the invention can be made without departing from the scope of this invention, it is intended that all matter contained in the above description or shown in the accompanying drawings shall be interpreted as illustrative and not in a limiting sense. Thus, for example, while in Figure 1 the oxygen and brine are indicated as flowing in direct contact in tower 15, an exchanger may be used in which the oxygen and brine flow in indirect heat exchange relation, thereby avoiding the introduction of moisture in the product oxygen stream. Figure 3 shows such a heat exchanger 15a in which oxygen from line 20 passes through a coil 15b in indirect heat exchange relation with brine from discharge pipe 17, exiting through line 21. The chilled brine leaves exchanger 15a through line 24. Also, instead of pumping the brine leaving towers 14 and 15 at a pressure close to atmospheric into tower 11 operated at a pressure of 60 to 100 pounds per square inch gauge, the brine may be recirculated through the air cooling tower and then pumped through a closed system in indirect heat exchange relation with the rectification product which effects cooling of the warm brine. In this way the brine effecting pre-cooling of the air is recirculated through a closed system in which there is a relatively small pressure head against which the brine-circulating pump must act. Less power would thus be consumed in pumping the brine through the system.

What is claimed is:

1. A process of producing oxygen by the liquefaction and rectification of air, which comprises, step (1), passing a stream of air under pressure of from about 60 to 100 pounds per square inch gauge and at a temperature of from 70° to 110° F. upwardly through a downwardly flowing stream of brine entering at a temperature of from 20° to −10° F., thereby cooling the air to a temperature below the freezing point of water and removing moisture and condensibles contained therein and simultaneously warming said brine; step (2), passing the thus cooled air in indirect heat exchange relation with oxygen and nitrogen rectification products, thereby cooling the air to a temperature near its liquefaction point; step (3), periodically reversing the flow of air and oxygen and of air and nitrogen through their respective paths of flow; step (4), introducing the thus cooled air into the rectification system and rectifying same to produce the said oxygen and nitrogen rectification products; step (5), passing the said oxygen and nitrogen rectification products from step (2) up through downwardly flowing streams of warm brine from step (1), thereby cooling the said brine; and step (6), refrigerating the brine to said temperature of from 20° to −10° F. and recycling the thus refrigerated brine through step (1).

2. A process of producing oxygen by the liquefaction and rectification of air, which comprises, step (1), passing a stream of air under pressure of about 60 to about 100 pounds per square inch gauge and at a temperature of from about 70° to 110° F. upwardly through a downwardly flowing stream of brine entering at a temperature of from about 20° to about −10° F., thereby cooling the air to a temperature below the freezing point of water and removing moisture and condensibles contained therein and simultaneously warming said brine; step (2), passing the thus cooled air through regenerators through which had previously passed oxygen and nitrogen products of rectification to cool the air to a temperature near its liquefaction point; step (3), periodically reversing the flow of air and nitrogen and of air and oxygen through said regenerators so that the oxygen flows through one of a pair of regenerators through which had previously passed the air and the nitrogen flows through one of a pair of regenerators through which had previously passed the air; step (4), introducing the thus cooled air into the rectification system and rectifying same to produce the said oxygen and nitrogen rectification products; step (5), flowing the said oxygen and nitrogen rectification products from step (2) up through downwardly flowing streams of warm brine from step (1), thereby cooling the said brine; and step (6), refrigerating the brine to said temperature of from about 20° to about −10° F. and recycling the thus refrigerated brine through step (1).

3. A process of producing oxygen by the liquefaction and rectification of air, which comprises, step (1), passing a stream of air under pressure upwardly through a downwardly flowing stream of chilled brine, thereby cooling the air to a temperature below the freezing point of water and removing moisture and other condensibles contained therein and simultaneously warming said brine; step (2), further cooling the thus cooled air to a temperature near its liquefaction point solely by passage in indirect heat exchange relation with at least one rectification product of said air; step (3), periodically reversing the flow of air and rectification product through their respective paths of flow; step (4), introducing the thus cooled air into the rectification system and rectifying same to produce said rectification product; step (5), chilling the warm brine to a temperature of from about 20° to about −10° F., said step (5) comprising the passage of said warm brine in heat exchange relation with said rectification product from step (2); and step (6), recycling the thus chilled brine through step (1).

4. A process of producing oxygen by the liquefaction and rectification of air, which comprises, step (1), passing a stream of air under pressure upwardly through a downwardly flowing stream of chilled brine, thereby cooling the air to a temperature below the freezing point of water and removing moisture and other condensibles contained therein and simultaneously warming said brine; step (2), passing the thus cooled air in indirect heat exchange relation with oxygen and nitrogen rectification products, thereby cooling the air to a temperature near its liquefaction point; step (3), periodically reversing the flow of air and nitrogen rectification product through their respective paths of flow; step (4), introducing the thus cooled air into the rectification system and rectifying same to produce said oxygen and nitrogen rectification products; step (5), chilling the warm brine to a temperature below said temperature below the freezing point of water, said step (5) comprising the passage of said warm brine in heat exchange relation with said oxygen and nitrogen rectification products from step (2); and step (6), recycling the thus chilled brine through step (1).

5. The process of claim 4 wherein the warm brine is in step (5) refrigerated to a temperature not above about 20° F.

6. The process of claim 3 wherein the rectification product passed in heat exchange relation with the warm brine does not contact said brine.

7. The process of claim 4 wherein the oxygen rectification product passed in heat exchange relation with the warm brine does not contact said brine.

PERCIVAL C. KEITH.

References Cited in the file of this patent

UNITED STATES PATENTS

| Number | Name | Date |
|---|---|---|
| 683,492 | Pictet | Oct. 1, 1901 |
| 1,724,513 | Pollitzer | Aug. 13, 1929 |
| 2,007,271 | Frankl | July 9, 1935 |
| 2,128,692 | De Boufre | Aug. 30, 1938 |
| 2,141,997 | Linde et al. | Dec. 27, 1938 |
| 2,423,543 | Yendall | July 8, 1947 |
| 2,516,717 | Ogorzaly | July 25, 1950 |